United States Patent [19]
Zuckerman

[11] 3,867,293
[45] Feb. 18, 1975

[54] ADSORPTION SYSTEM

[75] Inventor: Mathew M. Zuckerman, Palo Alto, Calif.

[73] Assignee: Envirotech Corporation, Menlo Park, Calif.

[22] Filed: July 23, 1973

[21] Appl. No.: 381,961

[52] U.S. Cl................. 210/252, 210/35, 210/264
[51] Int. Cl............................................. B01d 15/06
[58] Field of Search............ 210/31, 33, 34, 35, 39, 210/80, 252, 253, 264, 275

[56] References Cited
UNITED STATES PATENTS

| | | | |
|---|---|---|---|
| 184,093 | 11/1876 | Maynard............................ | 210/275 |
| 212,023 | 2/1879 | Maeurer............................ | 210/252 |
| 837,658 | 12/1906 | Bayley............................... | 210/252 |
| 3,134,735 | 5/1964 | Greenleaf, Jr..................... | 210/264 |
| 3,382,169 | 5/1968 | Thompson........................ | 210/35 X |
| 3,617,558 | 11/1971 | Jones.................................. | 210/35 |

Primary Examiner—Samih N. Zaharna
Assistant Examiner—Robert G. Mukai
Attorney, Agent, or Firm—Robert E. Krebs; Thomas S. MacDonald

[57] ABSTRACT

A device for adsorptively removing dissolved organic materials from liquid includes a vertically arranged housing which contains a bed of adsorption media and which has an influent inlet in its base. Two sets of collection launders horizontally extend across the housing, one above the other, and are alternatively used to collect filtrate from the adsorption bed. In the system, two such adsorption devices are connected in series with the connections controlled by valves so that filtrate is discharged from the upper set of launders of the first adsorption device then admitted to the second filtration device, and then discharged from the lower set of launders of the second device. The adsorption devices are further interconnected so that the alternative sets of launders are used when the flow through the system is reversed.

5 Claims, 5 Drawing Figures

PATENTED FEB 18 1975
3,867,293
SHEET 1 OF 2
FIG. 1.
FIG. 2.
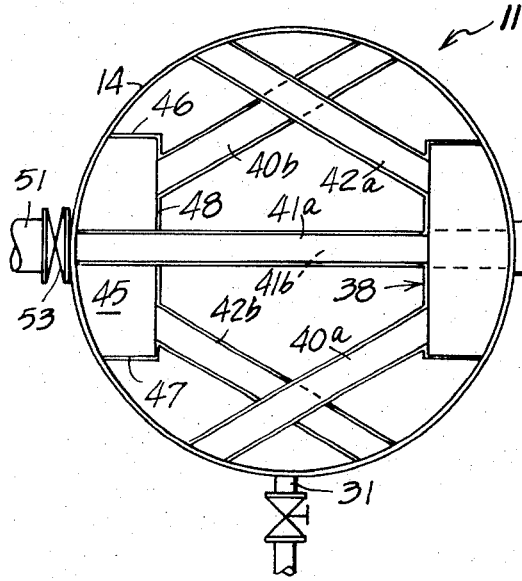
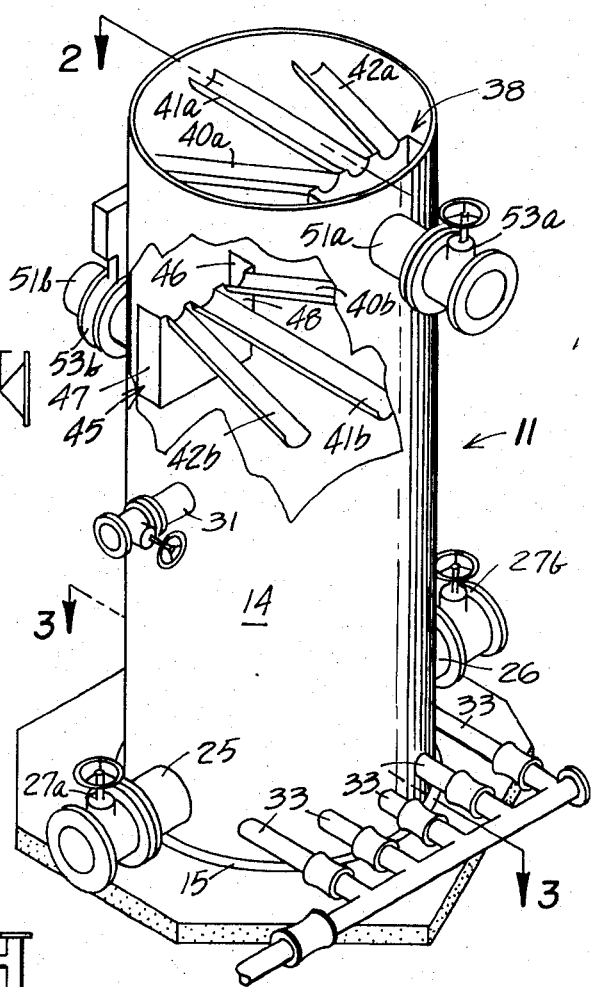
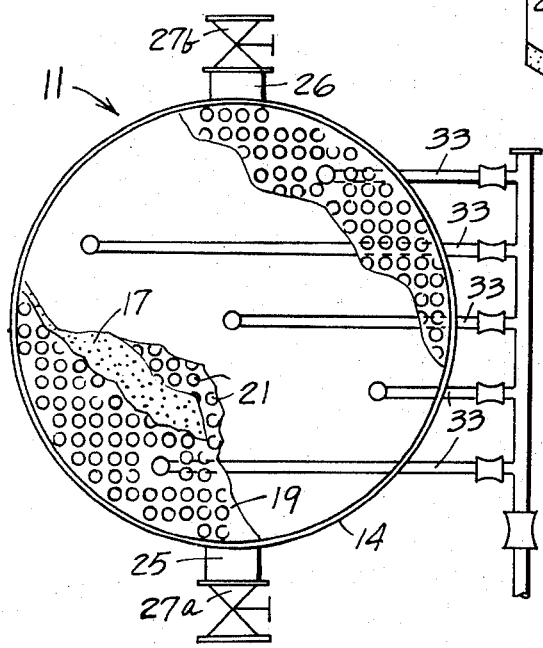
FIG. 3.

3,867,293

ADSORPTION SYSTEM

BACKGROUND OF THE INVENTION

1. Field of the Invention

The present invention relates to ways and means for removing impurities from liquids and, preferably, the invention relates to devices for adsorptively removing organic matter from water and wastewater.

2. State of the Art

Physical adsorption is a well-known method for removing dissolved organic materials from water. Physical adsorption, generally speaking, describes that which occurs when a fluid which contains dissolved contaminants is passed over the surface of certain materials which adsorb onto their surface the contaminants from the fluid. Devices for practicing adsorption are typically used in the latter stages of water treatment processes. Such devices usually comprise a housing having an inlet for admitting liquid to be filtered and an outlet for discharging filtered liquid and, interposed in the housing between the inlet and outlet, a bed of adsorption material for contacting the liquid. Commonly used adsorbant materials include, for example, activated carbon in granular or powdered form. It is known to arrange two or more such adsorption devices in series or parallel. A series arrangement of two adsorbers is known as "two-stage" adsorption. For treating certain wastewaters, two-stage adsorption can result in reduced carbon requirements as compared to achieving the same treatment in a single stage adsorber. In two-stage adsorption, it is important, however, that the adsorption media in the second adsorber be less saturated with organics (less spent) than the adsorption media in the first adsorber.

OBJECTS OF THE INVENTION

A primary object of the present invention is to provide improved ways and means for removing impurities from water and wastewater;

A more specific object of the invention is to provide improved treatment devices and a system incorporating such devices to treat water and wastewater;

Another object of the invention is to provide treatment devices which are particularly adapted for use in a series one with another;

Still another object of the invention is to provide treatment devices which can readily be used in a reversible series.

SUMMARY OF THE INVENTION

The present invention provides a treatment device and a system and process utilizing two such devices in a reversible series for, preferably, adsorptively removing dissolved organic matter from water and wastewater. In the preferred embodiment, the treatment device comprises a vertically arranged housing having an open upper end and a closed base above which is supported a bed of granular material (preferably, granulated activated carbon). An influent inlet is provided in the housing below the adsorption bed for admitting water to be filtered through the adsorption media. Above the adsorption bed are mounted first and second liquid collection means, one above the other, to alternatively discharge liquid from the device.

In one embodiment, the liquid collection means both comprise collection launders which horizontally extend across the interior of the housing and which connect to a valve-controlled liquid discharge device.

One system according to the invention comprises a series combination of two such treatment devices which are connected so that, with both treatment devices at the same elevation, liquid is first discharged from the upper liquid collection means of the first device and then passed through the second device and then discharged from the lower liquid collection means of that device. In other words, the upper liquid collection means of one of the treatment devices is interconnected with the influent inlets of the other treatment device and visa versa; with such an arrangement, the first treatment device automatically provides a predetermined hydraulic head to force liquid through the second device. Moreover, the devices are interconnected so that, if the media in the second device is replaced with fresh media before the media in the first device is replaced, the direction of flow through the devices can be reversed.

BRIEF DESCRIPTION OF THE DRAWINGS

The present invention may be further understood by referring to the following description and appended drawings, which are offered by way of illustration only and not in limitation of the invention whose scope is defined by the appended claims. In the drawings:

FIG. 1 is a pictorial view, partically cut away, of a device according to the invention;

FIG. 2 is a plan view of the device of FIG. 1 taken at the plane of the line 2—2 and viewed in the direction of the arrows; various portions of the device are shown schematically and some appurtenances to the lower half of the device of FIG. 1 are not shown in FIG. 2 for purposes of clarity;

FIG. 3 is a sectional view taken in the plane of the line 3—3 in FIG. 1 and viewed in the direction of the arrows to show the lower portion of the device (a portion of the structure shown in this view is also cut away and some portions are shown schematically)

DETAILED DESCRIPTION OF THE PREFERRED EMBODIMENT

Figure 4:
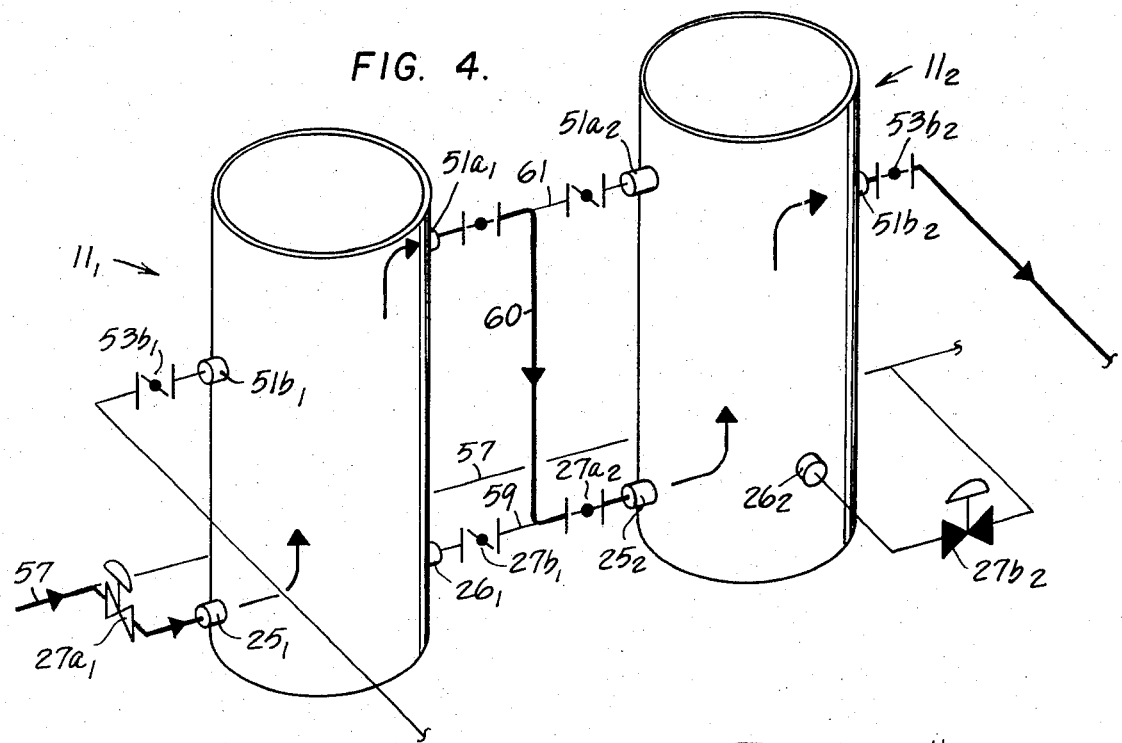
FIGS. 4 and 5 are generally schematic illustrations of two of the devices of FIG. 1 connected in series.

FIGS. 1-3 show a treatment device, generally designated 11, for removing contaminants from water or wastewater. Such devices which contain an adsorption media are generally referred to in the art as "adsorbers." Generally speaking, the treatment device 11 comprises a vertically-arranged housing 14 which contains a relatively static bed 17 of granular material and which has an inlet near its base for admitting influent liquid to the adsorption bed and an outlet above the bed for withdrawing effluent liquid. The preferred granular media is an adsorption media such as activated carbon in granular form, but other types of granular material known in the art can also be used.

In the illustrated treatment device 11, the vertically-arranged housing 14 has an open upper end, and a closed bottom 15. The granular bed 17 is supported in the housing by a circular plate 19 which is fixed transversely across the lower interior of the housing. A plurality of generally equally spaced-apart apertures 21 are formed through the plate 19 so that influent liquid can pass upward through the plate in a generally uniform flow. Conventional nozzles or other means, not shown, are fitted into the apertures 21 to prevent the granular media from draining down through the apertures, while still allowing liquid to flow upward. In this connection, it should be understood that it is very desirable that the flow of liquid upward through the bed be uniform (so-called "plug flow") so that all elements of the liquid are treated uniformly and have a generally equal contact there in the adsorption bed. With plug flow, process controls can readily be imposed upon the system and subsequent treatment processes may be carried out with a non-varying input.

The plate 19 is spaced above the housing base 15 so that it defines, with the housing, a compartment below the adsorption bed. Two inlet conduits, 25 and 26, connect in flow communication with the compartment for conveying influent liquid into the compartment. In each of the conduits are interposed conventional valves (designated 27a and 27b respectively) for selectively stopping the flow through the associated conduit. In operation, one of the influent valves will always be closed when the other is open; in other words, the influent conduits are used alternatively. Both of the inlet conduits 25 and 26 are connected to the housing at about the same elevation. Two influent conduits, rather than just one, are used in order to reduce the number and complexity of valves necessary to effect a series combination of the treatment devices but, aside from such considerations, the treatment devices could be equipped with only a single influent inlet.

Since the flow of influent liquid flows in an upward direction through the granular bed 17, a hydraulic head must be present external to the device in order to force the liquid upward. In other words, the influent must be under pressure. The pressure can be provided, for example, by an elevated reservoir or by a pump. An important feature of the illustrated adsorber is that it automatically provides a regulated head for an adsorber which is used in series downstream as will be explained hereinafter in detail.

With use, the adsorptive properties of the adsorption media decrease and, therefore, the media must be periodically removed from the bed and replaced with fresh media. In the illustrated device, fresh or regenerated media is introduced into the adsorption bed via a valve-controlled conduit 31 which connects through the wall of the housing 14 near the top of the bed. A plurality of adsorption media outlet conduits 33 are connected into the bottom of the bed at spaced intervals for reintroducing spent media. Thus, when fresh media is conveyed into the housing through upper conduit 31, spent media can be drained through lower outlet conduits 33. Other arrangements, however, can be provided for replacing media in the bed and the illustrated one is exemplary only.

As will now be explained with reference to FIGS. 1 and 2, the two liquid collection and discharge means are mounted on the adsorber and are used alternatively; that is, when one liquid removal means is in operation, the other is not. Furthermore, the two liquid collection means are substantially identical except that they are mounted at different positions within the housing. Because of their similarity, only the upper one will be described in detail herein and the same numerals with subscript $b$ will be used to refer to corresponding parts of the lower liquid collection means.

Thusly, the upper liquid removal means includes a "collection box" 38a fixed to the side of the housing 14. A plurality of launders 40a–42a are connected in flow communication with the collection box and extend more or less radially therefrom horizontally across the interior of the housing above the adsorption bed. The convergent ends of the launders open into the collection box and the divergent ends are closed and are supported by the housing. In operation, filtrate which rises from the adsorption bed spills over the edges of the launders and is then carried into the collection box. The launders can have a cross-sectional shape other than the illustrated semi-circular configuration; for example, the launders could be rectangular.

It should be emphasized that to achieve smooth and uniform collection of liquid, there should be only a "spill-over" flow into the collection launders. In other words, a launder should never be submerged when it is being used for liquid collection. (When liquid discharge is via the upper launders, the lower launders are necessarily submerged as will be explained hereinafter.) In other words, the launders should always be the hydraulic control for the vessel.

The collection box 38a is essentially an open-topped container and, in its illustrated embodiment, comprises a bottom 45a, a pair of end walls 46a and 47a, and a sidewall 48a spaced from the wall of the housing. In addition to supporting the collection launders, the sidewall and the end walls of the illustrated collection box 38a act as weirs with respect to the reservoir of liquid which overlies the granular bed: when the liquid level of the reservoir rises to a height sufficient for the liquid to spill over into the collection launders, filtrate also spills directly into the collection box. The walls of the collection box could, of course, be higher so that liquid would enter the box only via the collection launders. To discharge liquid from the adsorber, a discharge conduit 51a is connected through the wall of the housing in fluid flow communication with the interior of the collection box 38a. A valve 53a is interposed in this conduit for selectively stopping the flow of liquid therethrough. The valve can be of any conventional type which is suitable for shutting off liquid flow through a pipe.

It may now be readily understood that liquid which is discharged from the upper discharge conduit 51b has a greater head, because of its elevation, than liquid which is discharged from the lower conduit 51a. One aspect of the present invention is the selective and advantageous use of this differential in hydraulic heads.

Figure 5:
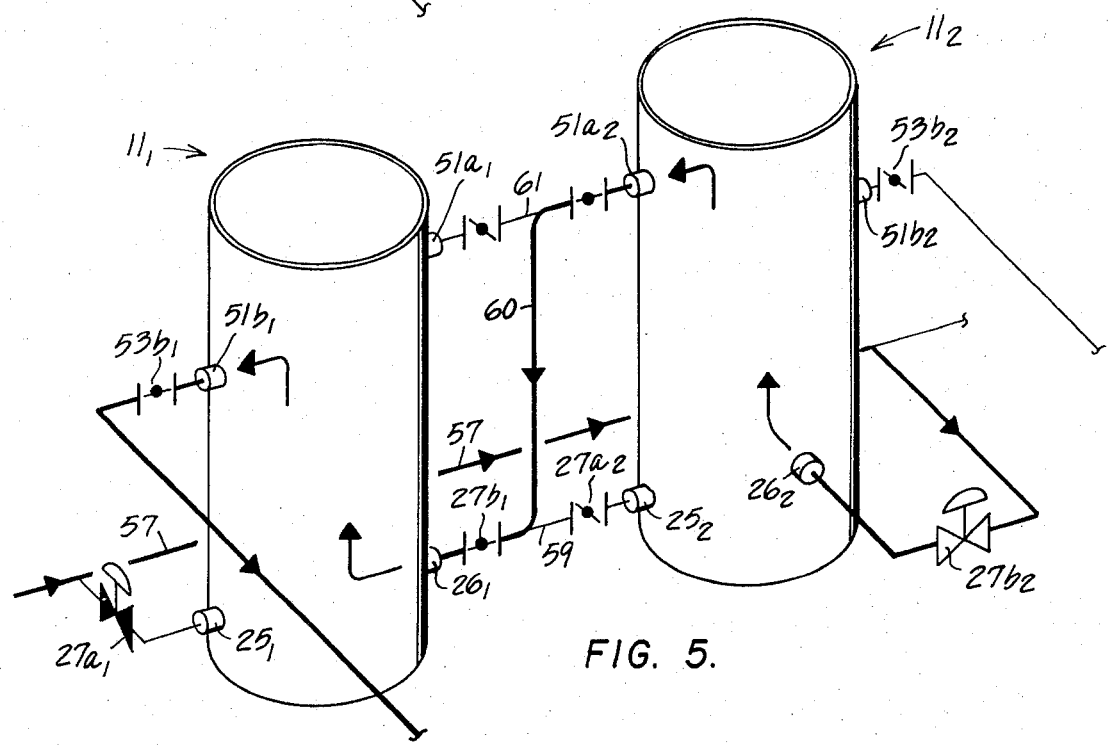

In FIGS. 4 and 5, two of the previously described treatment devices are connected together in series. The two devices are designated $11_1$ and $11_2$ to denote that they are substantially the same as the devices 11 which is illustrated in FIGS. 1–3 and the subscripts 1 and 2 are similarly used to designate associated parts of the devices. The two treatment devices are first connected together by a common pipe 57 which conveys influent liquid to a selected one of the adsorbers. In the illustrated arrangement, the pipe 57 connects the first inlet $25_1$ of the first treatment device $11_1$ (via the associated valve $27a_1$) and to the second inlet $26_2$ of the second treatment device $11_2$ (via the associated valve $27b_2$). By operating valves $27a_1$ and $27b_2$ so that if one is open the other is closed, influent is selectively conveyed to either of the devices. In FIG. 4, influent is first conveyed to device $11_1$ and in FIG. 2 influent is first conveyed to device $11_2$. In that regard, it is desirable that the valves be of the type which can be electrically controlled for simultaneous operation. For example, solenoid activated valves could be utilized.

The upper liquid discharge conduits $51a_1$ and $51a_2$ of each of the devices are connected to the second influent inlets $26_1$ and $25_2$ of the other adsorber. Thus, for example, discharge conduit $51a_1$ of adsorber $11_1$ is connected to inlet $25_2$ of adsorber $11_2$. It is convenient to use common pipes 59, 60, and 61 to make the interconnections as shown.

The lower liquid outlet conduits are used alternatively and, in the illustrated embodiment, are not connected together.

The purpose of the aforementioned interconnections between the devices is to allow them to be utilized in a reversible series. Thus, FIG. 4 illustrates the situation where influent flows first into device $11_1$ and from there into device $11_2$; FIG. 5 shows the converse situation. Such a reversible series of devices (called a two-stage "set") is particularly useful when two or more sets of adsorbers are being used because the adsorption media in the adsorbers can be regenerated, one adsorber at a time, without disrupting the operation of the entire system. The following tabulation illustrates how a pair of two-stage sets would be utilized together wherein adsorbers A and B are connected in one reversible series and adsorbers C and D are connected in another reversible series:

| Operation | Idle | Regeneration |
| --- | --- | --- |
| A - B | C - D | — |
| C - D | B | A |
| B - A | D | C |
| D - C | A | B |
| A - B | C | D |

I claim:
1. A system for removing impurities, such as dissolved organic materials, from water comprising:
 1. A pair of treatment devices for use in reversible series, each of which comprises:
  a. a vertically arranged housing;
  b. inlet means connected in flow communication with the lower interior of the housing for conveying influent liquid into the housing;
  c. a bed of adsorption material supported and arranged in said housing at least partly above said inlet means for adsorbing dissolved organic matter from the influent liquid;
  d. first filtrate collection means mounted in said housing above said adsorption bed to collect filtrate therefrom, said first filtrate collection means comprising: collection launders which horizontally extend across the interior of said housing, first discharge means connected in flow communication with said launders for discharging the collected filtrate outside said housing and valve means cooperative with said discharge means for selectively stopping the flow of liquid therethrough; and
  e. second filtrate collection means mounted in said housing and spaced above said first collection means to collect filtrate from said adsorption bed when said valve in said first collection means is closed to prevent discharge from said first collection means, said second filtrate collection means comprising: collection launders which horizontally extend across the interior of said housing and second discharge means connected in flow communication with said launders for discharging the collected filtrate outside said housing;
 2. A common influent conveying means connected in fluid flow communication with said inlet means of both of said treatment devices and valve means interposed in said influent means to selectively block the fluid flow to either of said treatment devices;
 3. Means connecting said second-discharge means of respective ones of said treatment devices to the inlet means of the other one of said treatment devices;
 4. Liquid discharge conveying means connected in fluid flow communication with said first discharge means of both of said treatment devices downstream of their respective said valve means for carrying liquid to remote discharge from a selected one of said treatment devices; whereby, in operation, influent is admitted to a selected one of said treatment devices, liquid is discharged from that filtration device via the second discharge means and conveyed, via the associated one of said connecting means, to the other one of said treatment device and then liquid is discharged from this other treatment device, via its first discharge means, into said common discharge conveying means.

2. A system according to claim 1 wherein said connecting means between said respective one of said treatment devices comprises a common pipe connected at one end to the second discharge means of both of said treatment devices and connected at its other end to the inlet means of both of said treatment devices.

3. A system according to claim 2 wherein third valve means are interposed in the second discharge means from each of said treatment devices before connection to said common pipe.

4. A system according to claim 1 wherein each treatment device of said pair thereof is mounted at the same elevation as the other.

5. A system according to claim 4 wherein said housings are open-topped.

* * * * *